Jan. 12, 1960
H. H. TALBOT
2,920,755
INDICATING DEVICE
Filed July 2, 1956
2 Sheets-Sheet 1
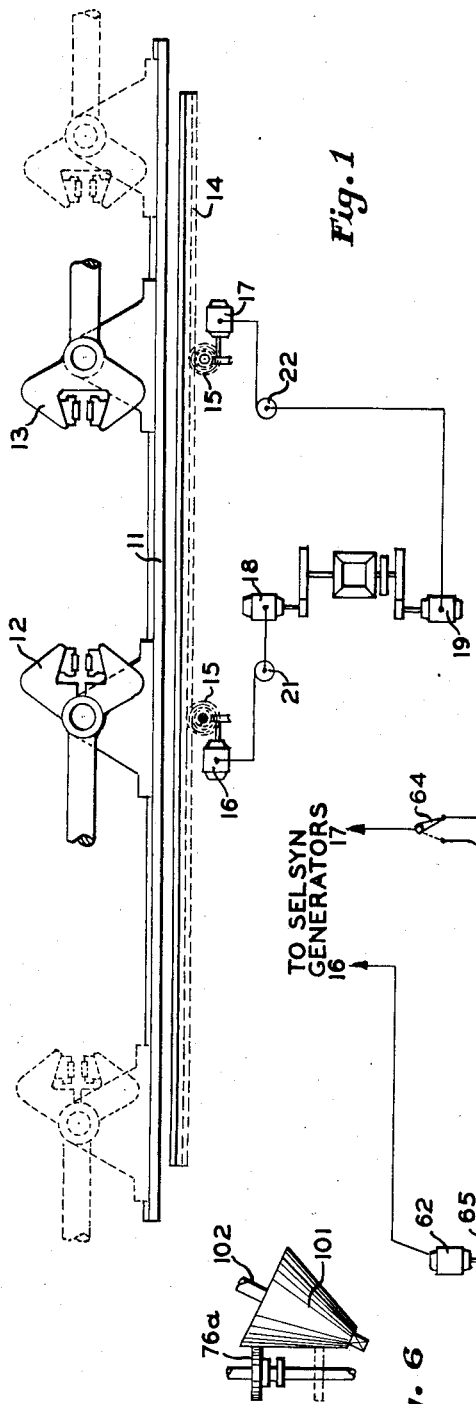
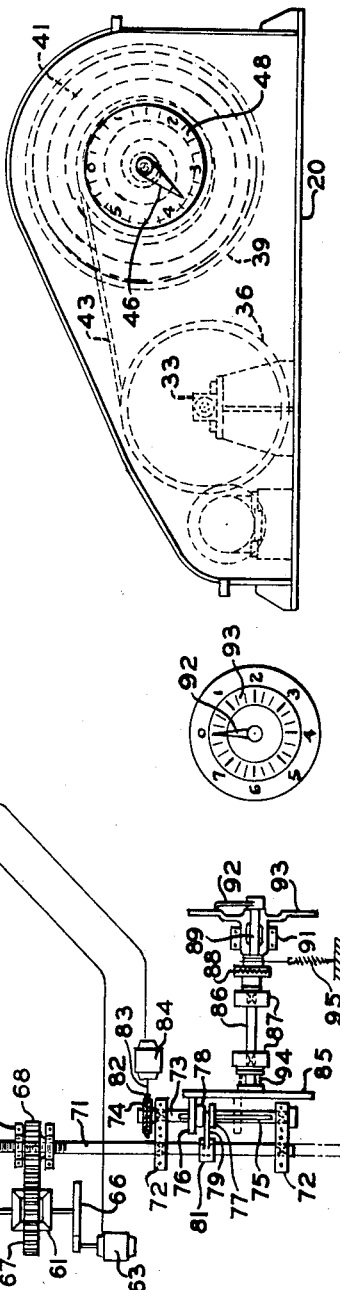
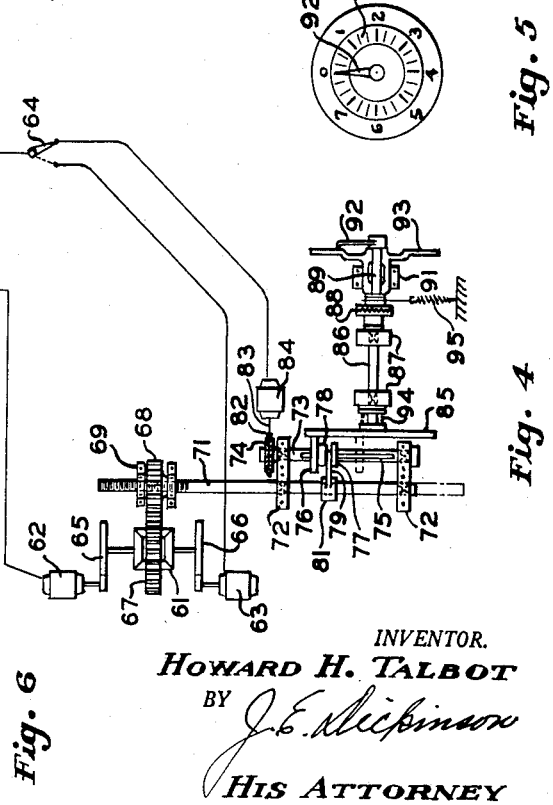
INVENTOR.
HOWARD H. TALBOT
BY J. E. Dickinson
HIS ATTORNEY Jan. 12, 1960

H. H. TALBOT 2,920,755

INDICATING DEVICE

Filed July 2, 1956

INVENTOR.
HOWARD H. TALBOT
BY
HIS ATTORNEY

United States Patent Office 2,920,755
Patented Jan. 12, 1960

2,920,755

INDICATING DEVICE

Howard H. Talbot, Pittsburgh, Pa., assignor to United Engineering and Foundry Company, Pittsburgh, Pa., a corporation of Pennsylvania Application July 2, 1956, Serial No. 595,446

3 Claims. (Cl. 205—1)

This invention relates to an indicating device and in particular to apparatus for indicating the percentage of elongation of a workpiece such as a plate, sheet or the like subjected to an elongation and reducing operation performed by a machine adapted to grip the workpiece at points adjacent to its ends and then apply sufficient force to stretch and reduce the workpiece as may be desired.

In combination with plate or sheet stretching apparatus as now employed there is usually included some form of indicating instrument or device for showing the percentage of stretch relative to the initial length of workpiece. When such a device is employed, in order to produce a certain percentage of elongation, as opposed to a percentage of stretch of the entire workpiece, it must be determined prior to the stretching operation the exact length of plate between the grippers and the final length to which the plate is to be stretched. It is apparent, therefore, that not only a more accurate device be employed but that an operator will be able to ascertain at a glance not merely the elongation of the workpiece as based upon the entire initial length but a percentage elongation irrespective of the initial length of workpiece.

It is, therefore, one of the objects of this invention to provide apparatus for measuring or indicating in terms of percentage the elongation effected during a stretching reducing operation which is particularly adaptable for use with a stretching machine for processing strips and plates of various lengths.

It is another object of this invention to provide an indicating device having elements responsive to the movements of opposed workpiece gripping heads of a stretching machine in which there is employed a spiral drum having variable, accurately proportioned diameters which bear a direct relationship to the various lengths of workpieces, from the shortest to the longest, the machine is adapted to process, the elements and the drums of the indicator being so arranged that the device will, irrespective of the initial length of the workpiece, indicate the exact percentage elongation of the workpiece.

It is a further object of this invention to provide an indicator which is adapted to denote the percentage elongation of a workpiece and which functions automatically irrespective of the lengths of workpieces being processed by the machine with which it is associated.

Still another object of this invention is to provide an indicating device of simple and compact construction, one which may readily be located at any desired point with respect to the stretching machine with which it is associated.

These objects, as well as the various other novel features and advantages of this invention, will become apparent from the following description and accompanying drawings of which:

Fig. 1 is a diagrammatic plan view of an indicating device embodying the features of the invention herein disclosed together with a plate stretching apparatus with which the device is associated;

Fig. 3 is a front elevation of the indicating device shown in Fig. 2;

Fig. 4 is a diagrammatic view of an indicating device embodying the invention in modified form;

Fig. 5 is an end view of the indicator dial shown in Fig. 4, and

Fig. 6 is a view of a modified form of the means employed in the indicator for rotating the shaft supporting the indicator pointer.

Figure 2:
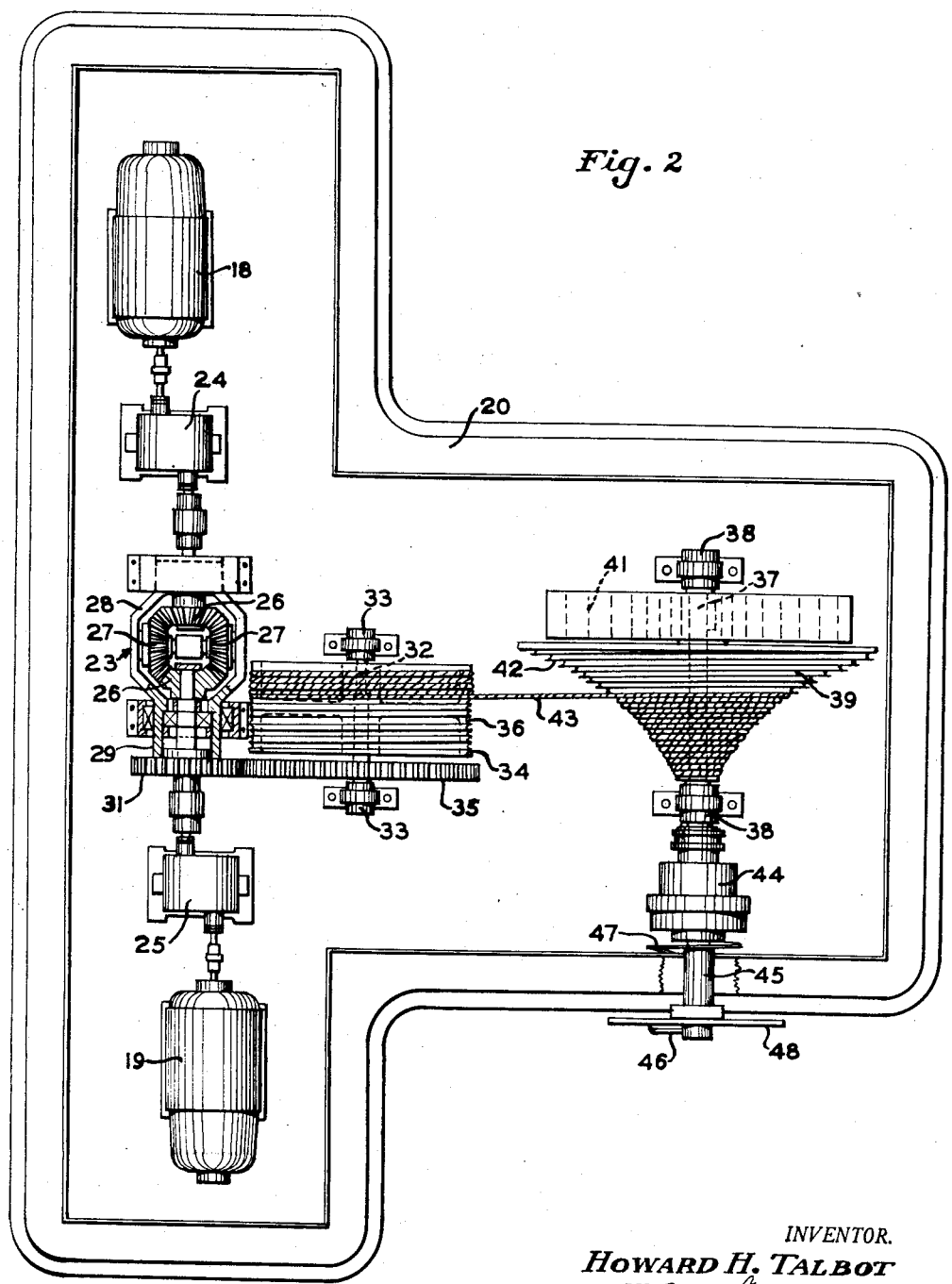
Fig. 2 is an enlarged plan view of the indicating device having the cover removed.

With reference to the drawings, particularly Fig. 1, the apparatus as illustrated therein diagrammatically represents in general a plate stretching apparatus designated by the numeral 11 having two plate gripper heads 12 and 13, the first of which is adjustable but normally stationary and the other movable relative thereto. The various related elements making up the stretching machine proper such as the frames, supports, gripper actuating means and power source are neither shown nor described specifically inasmuch as it is not considered to be necessary to do so in order to have a complete understanding of the invention herein disclosed. The adjustable gripper head 12 is adapted to be moved toward or away from the head 13 in order to accommodate plates of a given length corresponding to the final adjusted position of the head 12 for the processing of a plate or plates of a given length. The head 12 in its adjusted position, is locked in place and one end of the plate gripped by the jaws of head 12, the other gripper head 13, which is the working or tension applying head, is moved into position for gripping the free end of the plate. To accomplish the stretching and reducing operation, power is applied to the stretching apparatus to move the head 13 to the right as viewed in Fig. 1, and the plate stretched the required amount. Upon completion of the stretching operation, the gripper heads are released and the plate, in its stretched condition, is then removed from the machine and replaced by another for processing. This next plate, however, may be of a length different from that of the plate previously processed so that certain adjustments of the gripper heads will have to be made. Furthermore, if this new plate is to be so stretched, that the percent elongation is to be the same as the previous one, then in order to accomplish this operation accurately it is necessary to have an indicator, such as is disclosed by the applicant, for denoting the actual percentage elongation irrespective of the length of workpiece upon which a stretching operation is being performed. On the other hand, it may be required that the new plate be stretched either to a greater or lesser extent than the preceding one so that the indicator herein disclosed provides a means for determining accurately that the required amount of stretching has been accomplished and that certain desired metallurgical properties have been acquired by the stretched plate.

An indicating device for denoting the aforementioned conditions is diagrammatically illustrated in its preferred form in Fig. 1. In accordance with the drawings, there is an elongated rack 14 which is secured to one side of the stretcher frame having in mesh therewith a pinion 15 secured to each of the heads and meshing with suitable gears operatively connected to two selsyn generators 16 and 17 also attached to the gripper heads. The selsyn generators 16 and 17 are electrically connected to selsyn receivers 18 and 19 by suitable cables paid out from cable-retriever reel assemblies 21 and 22, respectively thereby permitting the generators to move with the heads to any position along the stretcher frame without causing the cables to loop or otherwise become unwieldy between the generators and receivers.

The selsyn receivers 18 and 19, as best shown in Fig. 2, are connected to the opposite sides of a differential gear unit 23 through gear reduction units 24 and 25 respectively which together with the selsyn receivers are attached to a suitable base 20. As shown, the output shafts of the units 24 and 25 are connected to the separate sun gears 26 which in turn are in mesh with idler sun gears 27 journaled in the casing 28 of the differential gear drive unit. One end of the casing 28 extends in a direction toward the selsyn receiver 19 and upon the extension 29 thereof there is rigidly mounted for rotation with the casing a spur gear 31. It will be noted that the output shaft of the gear reduction unit passes through and freely rotates within and relative to the housing extension 29.

Spaced from the differential gear unit there is a shaft 32 rotatably supported in suitable pedestal bearings 33, upon which there is mounted a drum 34 and a gear 35 which meshes with the spur gear 31 of the differential. On the outer periphery of the drum 34 there is formed a continuous helical groove 36 which extends along a substantial portion of the drum surface. Spaced from the drum 34 and parallel to the shaft 32 there is a shaft 37 rotatably mounted in suitable pedestal bearings 38, and upon which there is mounted a bell-shaped drum 39 and a coiled tension spring 41 attached at its inner end to the shaft and at its outer end to the base 20. The drum 39 is provided with a spiral groove 42 which corresponds in pitch to the grooves of the drum 34, which grooves form a track for a cable 43 wrapped partially around each of the drums, as indicated in Fig. 2, adapted to be payed off one of the drums and onto the other, the cable being kept under tension at all times by the action of the spring 41.

As to the contour of the sides of the bell-shaped drum 39, this has been calculated in such a fashion that for any given point on the surface of the drum there is a corresponding length of workpiece which is to be processed by the stretching machine. For purposes of illustration, let it be assumed that it is desired to stretch various sizes of plates varying in lengths from a minimum of ten feet to a maximum of fifty feet and that the maximum elongation desired will be five percent.

Since percentage elongation is independent of the initial length of the workpiece, the applicant has determined mathematically, in accordance with the procedure which follows, the exact contour of the sides of the bell-shaped drum which will provide a direct indication of percentage elongation. In connection with the mathematical computations hereinafter set forth, the following symbols will be employed:

$D$ = the diameter of the bell shaped drum 39 at the point where the cable leaves the drum.
$D_1$ = the minimum diameter of the bell shaped drum 39.
$D_2$ = the maximum diameter of the bell shaped drum 39.
$O$ = the point of attachment of the cable to the drum 39.
$OX$ = the point where the cable leaves the drum 39.
$N$ = the number of grooves on the drum 39.
$P$ = the pitch of grooves of the drum 39.
$l$ = the length of the drum 39.
$X$ = the length of the drum from a point $(X, D)$ to the small diameter end thereof.
$\phi$ = the total angle of the wraps in radians of the cable on the drum starting from the initial point of attachment $(O)$ to the other end of the cable defined by the point $(X, D)$.
$L$ = the length of the workpiece.
$L_1$ = the minimum length of a workpiece handled by the stretcher.
$K$ = a constant defined as the ratio of the diameter of the drum 39 at any point to the length of a workpiece $(L)$ that is being stretched.
$e$ = the base of the napierian logarithm.
$ln_e$ = the natural logarithm.

The equation for the contour of the bell shaped drum 39 is derived from the specific conditions under which the invention is to be employed in which the diameter of the drum 39 at a particular diameter $D$ at any point $X$ is proportional to the length of the cable wound on the drum from its point of attachment at $(O)$ to the end of the cable at point $(X, D)$, which relationship may be expressed by the equation $D=KL$.

This equation for computing the contour of the bell shaped drum is an exponential curve, specifically $$D = D_1 e^{\frac{\pi K}{2p}X}$$

in which, as given above, $K$ is a constant defined as the ratio of the diameter of the drum at any point to the length of a workpiece $(L)$ that is being stretched as defined by the equation $D=KL$.

Therefore, $$\frac{D}{D_1} = e^{\frac{\pi K}{2p}X} \text{ or } \ln_e \frac{D}{D_1} = \frac{\pi K}{2p}X$$

from which $$X = \frac{2p}{\pi K} \ln_e \frac{D}{D_1}$$

Taking the minimum length of plate $L_1$ as 10 feet, the minimum diameter $D_1$ as 4 inches, and $p$ as ¼ inch, since the diameter $D$ of the drum at any point is to be proportional to the length $L$ of workpiece, then $D=KL$, thus $K$ can be determined.

Then $D_1$ (minimum) $=KL_1$ (minimum) or $4=K \cdot 10 \cdot 12$ or $K=.0333$ and $$\frac{2p}{\pi K} = \frac{2 \cdot \frac{1}{4}}{\pi \cdot .0333} = 4.775$$

so that $$X = 4.775 \ln_e \frac{D}{4}$$

For the maximum length of plate to be processed, $D_2$ (maximum) $= K \cdot 50 \cdot 12$
$\qquad = .0333 \cdot 50 \cdot 12$
$\qquad = 20$ inches $X$ (maximum) $= 4.775 \ln_e \frac{20}{4}$
$\qquad = 4.775 \ln_e 5$
$\qquad = 4.775 \cdot 1.61$
$\qquad = 7.70$ inches axial change or length of drum required For the selected pitch $p=¼$ inch, the number of turns of the spiral groove around the bell-shaped drum $$N = \frac{\text{axial length}}{\text{pitch}}$$

or $N = 7.7 \div ¼ = 30.8$, or, for convenience, assume this to be 31 turns.

The preceding may be verified in the following manner:

$$\int_0^L dL = ¼ \int_0^\phi D \, d\phi$$

where $\phi$ = angle in radians.
Since $$D = D_1 e^{\frac{\pi K}{2p}X}$$

and $$X = \frac{p}{2\pi}\phi$$

we have $$D = D_1 e^{\frac{\pi K}{2p} \cdot \frac{p}{2\pi}\phi} = D_1 e^{\frac{K}{4}\phi}$$

and therefore for our particular case $D=4e^{.00832\phi}$
Therefore $$\int_0^L dL = \frac{1}{4} \cdot 4 \int_0^\phi e^{.00832\phi} d\phi$$

or $$L \text{ (inches)} = 120 e^{.00832\phi}$$

or $$L \text{ (feet)} = 10 e^{.00832\phi}$$

For $\phi = 0$ radians, $$L = \text{(feet min.) } 10 e^0 = 10 \text{ feet}$$

For $\phi = 31$ times or $62\pi$ radians, $$L \text{ (feet maximum)} = 10 e^{.00832 \cdot 62\pi}$$
$$= 10 e^{1.622} = 10 \cdot 5 = 50 \text{ feet, approximately}$$

With respect to the change in length, or stretch, $\Delta L$:

$$\Delta L = D/4 \cdot \Delta \phi$$

$$\Delta \phi = \frac{4}{D} \cdot \Delta L$$

Since $D = KL$ $$\therefore \Delta \phi = 4 \frac{\Delta L}{KL}$$

$$\Delta \phi = 120 \frac{\Delta L}{L}$$

$$\frac{\Delta L}{L} = \frac{\Delta \phi}{120}$$

Now the percentage stretch is $$100 \frac{\Delta L}{L} = \frac{100}{120} \Delta \phi$$

$$= .833 \Delta \phi$$

where $\phi$ is expressed in radians.

Thus for 1% stretch, the rotational movement of the drum is 1.20 radians or 68.6°, and for 5% stretch the rotational movement is 6.0 radians or 345°.

From the foregoing calculation it is apparent that for a given initial length of workpiece, the cables will, by reason of adjustment of the gripper heads to accommodate the particular length workpiece, automatically be unwound from one of the drums and wound upon the other so that the diameter of the bell-shaped drum at the payoff position of the cable will be the proper diameter for the initial length of workpiece and the gradual elongation of the workpiece caused by the stretching forces applied to the gripper heads will cause the position of the cable to change with respect to the drum surface so that it will at the payoff position always be at a drum diameter which bears a direct relation to the workpiece. Thus, a certain percent elongation of the workpiece will bear a direct relation to the number of radians the spiral drum is permitted to turn.

It will be appreciated that the diameter of the cylindrical drum 34, and therefore the amount of cable paid off and wrapped upon the spiral drum, along with the gear reduction required to cause the cylindrical drum to be rotated the desired amount to assure the necessary proportional relationship of the rotation of the spiral drum with respect to the length of workpiece, as well as to the elongation thereof are purely mechanical considerations in view of the foregoing explanation, which variables are dependent upon the capacity of the stretching apparatus and the overall size of the indicator finally decided upon.

At the far end of the spiral drum shaft 37 as mentioned there is secured a spiral spring 41 which applies torque to the shaft in such a direction as to apply constant tension to the cable. At the opposite or near end of the shaft 37 there is a magnetic clutch 44 adapted to be engaged for connecting together the shaft 37 and a shaft 45 to which an indicator hand or pointer 46 is secured. A spring 47 is secured to the shaft 45 for returning the pointer 46 to its zero position when the clutch 44 is disengaged. A dial 48 is provided with a series of graduations worked off in equal increments around the surface thereof which indicate percentage of elongation from zero percent to five percent.

With respect to the preferred form of the invention as shown in Figs. 1, 2 and 3, the operation thereof may be briefly summarized as follows:

Depending upon the length of the plate to be processed, the normally stationary but adjustable gripper head 12 is moved to its proper workpiece gripping position and there secured so that no further movement takes place either during a stretching operation or for the processing of successive workpieces of the same length. The opposite or working head 13, on completion of the previous stretching operation is returned to its initial or zero position so that both heads are now in readiness to grip the ends of the workpiece and accomplish a stretching operation. By reason of the movement of the head 12, through the actuation of the selsyn 16, receiver 18 and cage 28 of the differential, the drum 34 is rotated in a direction depending upon the direction in which the head 12 is moved for adjustment, and the cable will either be paid off or wrapped upon the drum 34 and the point at which the cable first contacts the bell-shaped drum 39 will be on a diameter proportional to the distance between the gripping heads or, expressed in another manner, will bear a direct relationship to the initial length of the workpiece to be stretched. Of course, when the gripper head 13 is moved to its initial position, movement is also transmitted to the drum 34 through the selsyn 19, reducer 25 and the cage of the differential thereby finally determining the plate gripping positions of the two heads.

Upon completion of the adjustment of the heads and the securing of a workpiece at its ends by the gripper heads, the magnetic clutch 44 is reengaged and power then applied to the movable gripper head 13 and the plate stretched to give the desired percentage elongation which will be indicated directly by noting the position of the pointer hand with respect to the graduations on the dial.

The movement of the head 13 during the working stroke will, of course, be transmitted proportionately through the differential gear unit 23 to the cylindrical drum 34 to cause a slight paying off of the cable 43 therefrom, thereby permitting the bell-shaped drum 39 to rotate through a given angle proportionate to the elongation of the workpiece and the cable will be wrapped upon the bell-shaped drum and due to the ever increasing diameter thereof the rotation of the drum 39 bears a direct relationship to the increase in elongation. As stated above, it is then but necessary for the operator to observe the position of the pointer hand on the dial to determine the exact percentage elongation of the workpiece at any time as the stretching operation progresses.

After a stretching operation has been completed on a plate, the working pressure is interrupted and the plate released from between the jaws of the grippers and the magnetic clutch 44 disengaged to permit the pointer hand to return to zero. Irrespective of the length of subsequent workpieces to be processed, of course within the limits of the lengths which may be accommodated by the stretching machine, the movement of the adjustable gripper head 12 and the working head 13 will cause the bell-shaped drum 39 to rotate through the required number of revolutions to place the cable at the proper position along the drum surface so that the drum diameter at the point at which the cable makes contact with the drum will, as in the previous case, again be proportionate to the distance between the two gripper heads.

In the modified form of invention set out in Figs. 4 and 5 of the drawings and to take the place of the elements connected to the generators 16 and 17 of the preferred embodiment, there are shown a differential gear unit 61 to which there are connected selsyn receivers 62 and 63 which, in turn, are electrically connected to the pair of selsyn generators 16 and 17 as shown in Fig. 1. The selsyn receiver 62 is connected to the selsyn generator 16 mounted upon the adjustable gripper head 12 whereas the receiver 63 is, through one branch of an intermediate two-way switch 64, connected to the generator 17 mounted on the stretcher working head 13. The selsyns 62 and 63 are mechanically connected to the opposite input shafts of the differential unit 61 by a train of gears 65 and 66 respectively. Secured to the cage of the differential unit there is a spur gear 67 which meshes with a pinion 68 secured to a nut 69 threadably engaged with a threaded shaft 71 mounted in suitable bearings contained within pedestals 72 and adapted to move in an axial direction on rotation of the nut 69. Parallel and adjacent to the shaft 71 and mounted at its ends in suitable bearings within the pedestals 72 there is a shaft 73 provided at its one end with a worm gear 74 and with a spline 75 extending along its length. Mounted upon the shaft 73 for movement along the splined portion there is a friction wheel 76 having a hub extension 77 which is machined out to provide a reduced diameter section 78 into which there is received the forked outer end of an extension 79 secured to a collar 81 keyed to the shaft 71. Thus, when the shaft 71 is moved axially by rotation of the gear 68, the forked extension 79 moves with it thereby moving the friction wheel 76 along its shaft 73. The worm gear 74 is rotated by means of a worm 82 engaged therewith which is mounted upon a shaft 83 extending from a selsyn receiver 84 which is, through the remaining branch of the intermediate two-way switch 64, electrically connected to the generator 17 mounted upon the stretcher working head 13. With further reference to Fig. 4 there is shown a friction disc 85 which is mounted upon a rotatable shaft 86, the shaft being supported in suitable bearings 87 and connected to one plate of a magnetic clutch 88. To the other plate of the clutch there is connected a shaft 89 supported in suitable bearings in an indicator frame 91 having an indicator pointer or hand 92 secured to its outer end. Adjacent to the pointer 92 there is an indicator dial 93 marked off in percentages of stretch which is fixed to the indicator frame 91. As will be noted, the wheel 76 and disc 85 are at right angles to and make frictional contact with each other so that on rotation of the wheel 76, the disc 85 will thereby be rotated an amount proportional to the diameter of the wheel 76 and the distance between the shaft 86 and the point at which the wheel 76 makes contact with the surface of the disc 85. In order to maintain a positive frictional contact between the wheel 76 and disc 85, a compression spring 94 is provided on the shaft 86 between one of the bearings 87 and the disc 85. A tension spring 95 is attached to the shaft 89 at one end and to the base at the other which provides for returning the pointer 92 to its zero position when the magnetic clutch 88 is released after each workpiece stretching operation.

As a further modification of the invention, there is shown in Fig. 6 a truncated cone 101 which serves the same purpose as the friction disc 85, with the friction wheel 76a therein shown being in frictional contact therewith and adapted to be moved along the surface from the larger to the smaller diameter portions of the cone in a similar fashion as the friction wheel 76 is moved across the surface of the disc shown in Fig. 4. As is noted the axes of the friction wheel 76a and of the truncated cone 93, however, are offset at an angle less than 90°. To the shaft 102 of the truncated cone 101 the indicator elements are connected in a fashion similar to that in which they are connected to the shaft 86 as is shown in Fig. 4. As is evident from this modification as well as from the arrangements shown in both Figs. 2 and 4, these embodiments provide for maintaining a definite ratio at any instant of original length to length of workpiece as stretched as the heads of the stretching apparatus are moved relative to and away from each other.

With respect to the modification disclosed in Fig. 4, the operation of the device therein disclosed may be briefly summarized as follows:

The switch 64 is first positioned to connect the selsyn receiver 63 to the transmitter connected to the stretcher head 13. As the head 13 is moved to its initial plate end gripping position, the gear 68 will be rotated thereby to rotate the nut 69 and cause the shaft 71 to be moved in an axial direction thereby to position the friction wheel 76 at its proper radial distance with respect to the surface of the friction disc 85 with which it makes contact. On movement of the other head 12 to a position to grip the remaining end of the workpiece, the cage of the differential unit 61 will be rotated in such a manner as again to cause the nut 69 to rotate and move the friction wheel 76 to its final position along the surface of the disc 85, which final position is thereby determined by the initial length of the workpiece. With the initial position of the friction wheel 76 having thus been determined, the magnetic clutch 88 is energized and the switch 64 closed to connect the selsyn generator of the head 13 to the selsyn receiver 84. As the workpiece is stretched, the movement of the gripper head 13 will be communicated to the selsyn receiver 84 through the transmitter 17 thereby causing the worm 82 and gear 74 to be rotated to drive the shaft 73 and the friction wheel 76 secured thereto so that the friction disc 85 will be rotated through the proper angle depending upon the percentage of elongation of the workpiece, which percentage will be evident to the operator by the position of the pointer 92 with respect to the graduations marked on the indicator dial 93. It is apparent, therefore, that within the limits of the stretching apparatus itself, the friction wheel 76 will be positioned at the proper point of contact with respect to the friction disc 85, as will the friction wheel 76a with respect to the surface of the truncated cone 101 as shown in Fig. 6, so that the rotation of either disc 85 or truncated cone 101 will be so proportionally related to the amount of stretch of the workpiece with respect to the initial length thereof that the percentage of elongation will thus be readily apparent to the operator at any instant during the stretching operation.

In accordance with the provision of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In combination with apparatus for performing a stretching operation upon elongated workpieces of various lengths such as sheets, plates, bars and the like by applying tension forces across an area thereof in which there are employed relatively movable gripping means for gripping a workpiece at oppositely spaced points, a device for indicating the percentage of elongation of said workpieces during the stretching operation performed thereon and irrespective of the original length thereof comprising selsyn generator means connected to and responsive to the movement of said gripping means, the output of said selsyn means being directly related to the increase in length of said workpiece as compared with the original length thereof, a first drum of uniform diameter and a second drum having a uniformly progressively decreasing diameter from one end to the other and a spiral groove provided along the surface thereof, a cable extending between said drums and operatively arranged to be wrapped upon one of said drums as it is unwrapped from the other, means operably connecting said first drum to said selsyn generator means, and indicating means operatively connected to said second drum whereby on movement of said workpiece gripping means with a workpiece confined therebetween said drums will be rotated from the initial positions thereof and in such a direction as to cause said cable to be payed out from said first drum and wrapped upon said second drum thereby to cause said indicating means to denote the percentage of elongation of said workpiece as the stretching operation progresses.

2. In combination with apparatus for performing a stretching operation upon elongated workpieces according to claim 1 in which there is included differential gearing means interposed between said selsyn generator means and said first drum.

3. In combination with apparatus for performing a stretching operation upon elongated workpieces according to claim 1 in which a pair of selsyn generators are operatively connected between said gripping means and said first drum.

References Cited in the file of this patent

UNITED STATES PATENTS

| | | |
|---|---|---|
| 2,297,812 | Stoltz | Oct. 6, 1942 |
| 2,432,828 | Stone | Dec. 16, 1947 |
| 2,447,208 | Rendel | Aug. 17, 1948 |
| 2,618,769 | Osterman | Nov. 18, 1952 |
| 2,637,496 | Sperry | May 5, 1953 |
| 2,665,065 | Davidson | Jan. 5, 1954 |
| 2,714,917 | Siegerist | Aug. 9, 1955 |

FOREIGN PATENTS

| | | |
|---|---|---|
| 581,095 | Great Britain | Oct. 1, 1946 |